Aug. 20, 1968 W. H. HULTGREN 3,397,786
DUAL ELEMENT FILTER ASSEMBLY HAVING PLURAL VALVES THEREIN
Original Filed Aug. 24, 1964 2 Sheets-Sheet 1
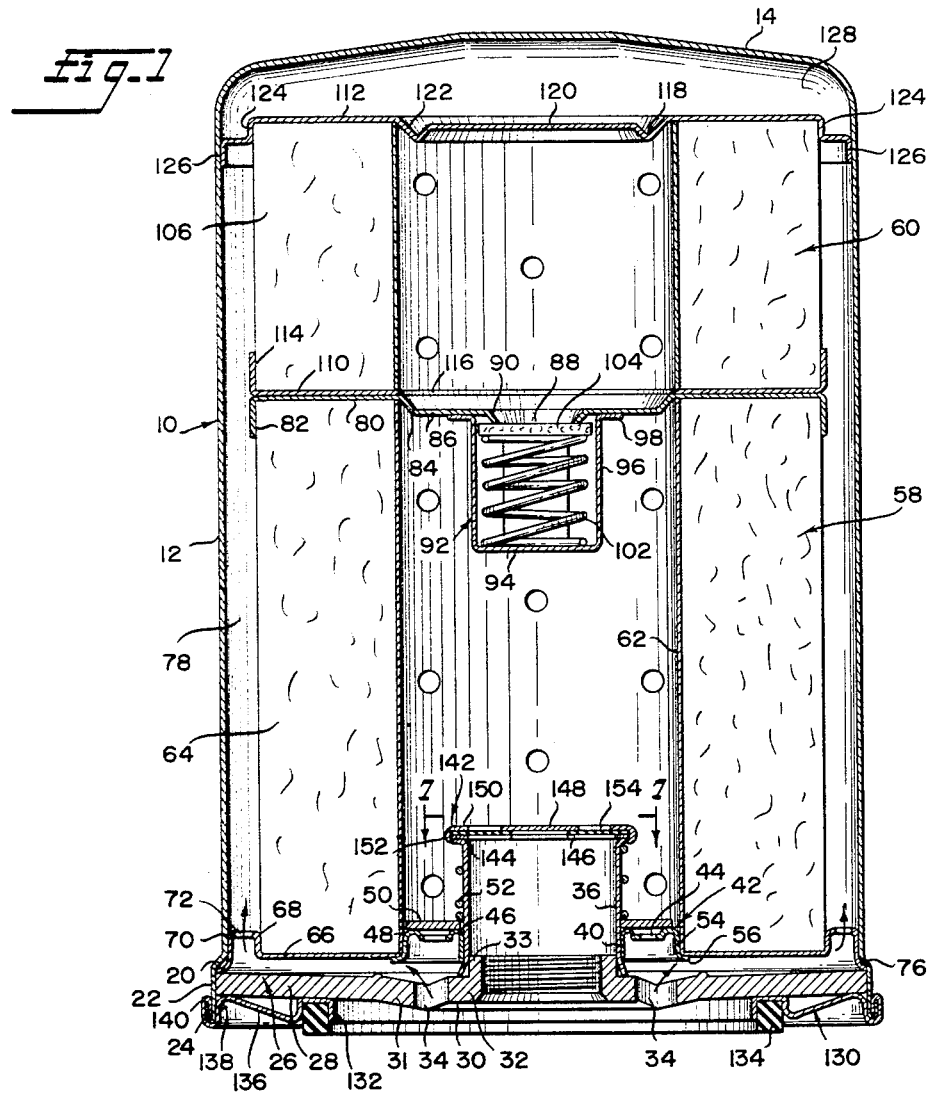
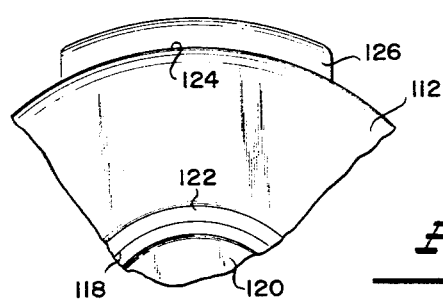
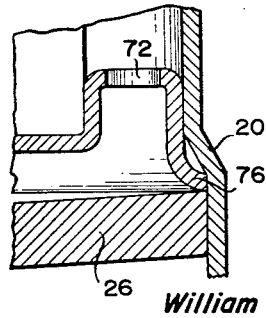
INVENTOR
*William H. Hultgren*
BY *Winter & Jockman*
ATTORNEYS Aug. 20, 1968 W. H. HULTGREN 3,397,786
DUAL ELEMENT FILTER ASSEMBLY HAVING PLURAL VALVES THEREIN
Original Filed Aug. 24, 1964 2 Sheets-Sheet 2
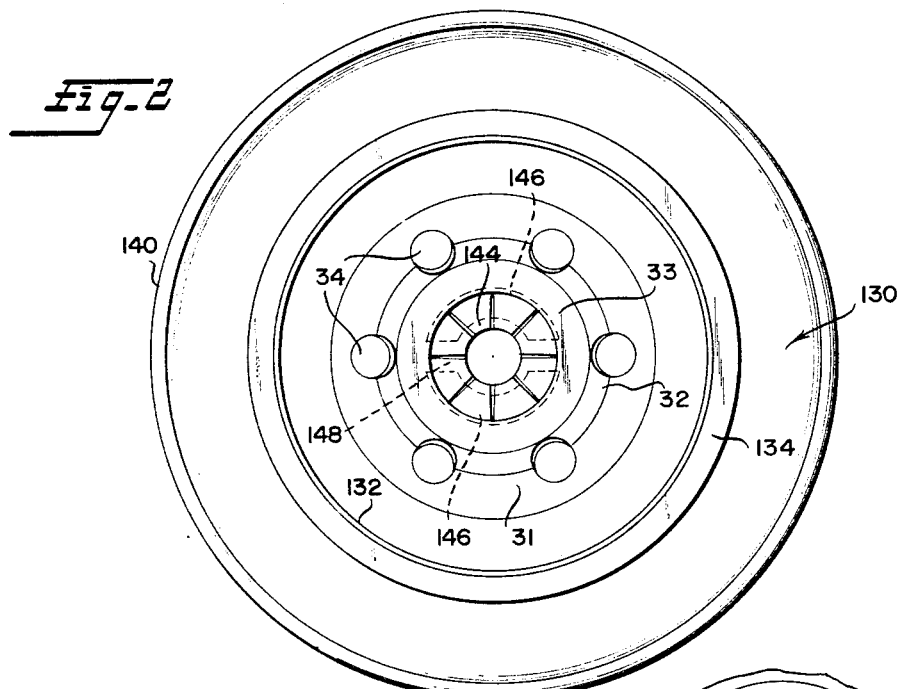
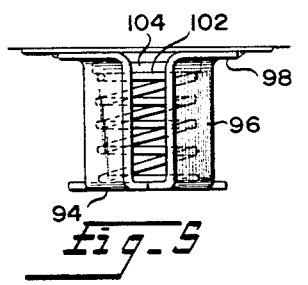
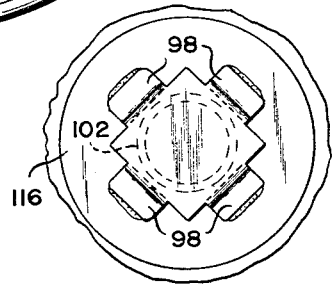
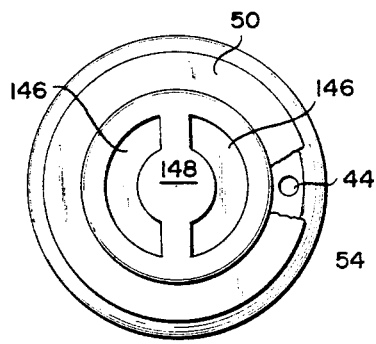
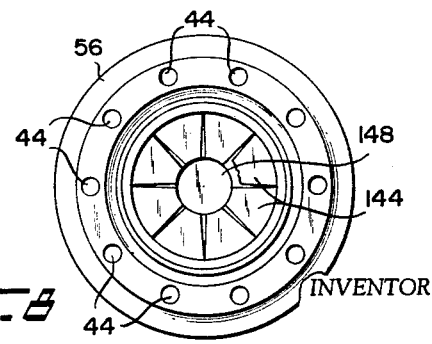
INVENTOR
William H. Hultgren
BY Winter & Jockman
ATTORNEYS United States Patent Office 3,397,786
Patented Aug. 20, 1968

3,397,786
DUAL ELEMENT FILTER ASSEMBLY HAVING
PLURAL VALVES THEREIN
William H. Hultgren, Mount Carmel, Ill., assignor to Champion Laboratories, Inc., West Salem, Ill., a corporation of Connecticut
Continuation of application Ser. No. 391,495, Aug. 24, 1964. This application July 17, 1967, Ser. No. 654,003
1 Claim. (Cl. 210—132)

ABSTRACT OF THE DISCLOSURE

A spin-on type filter assembly comprising dual, annular, stacked filter elements, an open ended housing closed off by a bottom member, dual by-pass valves, and a check valve, and having the outer periphery of the lowest end cap locked between the bottom member and an outwardly extending portion of the housing and the outer periphery of the highest end cap extending to the housing wall to position the filter elements in the housing.

---

This is a continuation of U.S. application Ser. No. 391,495, filed Aug. 24, 1964, now abandoned.

The present invention relates to a filter, and more particularly to a filter for purifying and conditioning fluids, such as oil and the like.

The present invention further relates to what is commonly known as a dual oil filter which is provided with a plurality of filter elements disposed in a housing or casing in which the filter elements have different flow rates.

The present invention also relates to a spin-on or screw-on type oil filter which is adapted to be mounted on the engine block of an internal combustion engine, although it is not to be limited to this particular use since it is apparent that it can be used in many other systems, if desired. However, for purposes of illustration only, the oil filter of the present invention will be described in connection with its use for an internal combustion engine.

The present invention also relates to a dual-flow filter provided with a plurality of filter elements disposed in a casing or housing and having different flow rates, which dual-flow filter can also be disposed in a casing and used as a filter, and is not necessarily limited to the use of the plurality of filter elements with a spin-on or screw-on oil filter.

The present invention also relates to a dual-flow filter unit having a plurality of individual filter elements disposed in a casing and in which the filter unit is adapted for use as what is commonly referred to or known as a full-flow unit. In a full-flow filter unit, the full-flow unit must be capable of passing oil to the surfaces to be lubricated at the maximum rate required under any set of operating conditions, at all times. It is necessary that provision in a full-flow unit be made for bypassing oil around the filtering elements whenever flow through these elements is impeded or interrupted for any reason, or there is undue restriction through the filter elements such as any excessive pressure drop thereacross. If the filtering elements disposed within the casing are not replaced, or the spin-on type oil filter is not discarded and replaced with a new filter unit containing a plurality of different flow-rate filter elements, before the dirt and contaminants accumulate on the upstream side of the filter elements before they become unduly clogged so as to excessively reduce the flow of oil therethrough, unfiltered oil must be bypassed around the filtering elements at a sufficient rate to compensate for the reduced flow-rate or reduced capacity of the filtering elements. Bypassing oil around the filtering elements is sometimes required when the viscosity of the oil is abnormally high, such as when an internal combustion engine or other machine is initially started and the oil is cold, with the viscosity of the oil diminishing as the oil is warmed by the normal heat from the operation of the engine or machine.

In a full-flow filter unit it is quite obvious that it is most desirable to filter all of the oil and to bypass as little as possible unfiltered oil to the engine parts in order to avoid any deleterious effects to the parts of the engine requiring lubrication. It is also obvious that the finer the filter material or the filter element, the more efficient the filter unit is because the finer will be the size of the dirt, solid particles and contaminants filtered out of the oil stream to thereby cause less wear to the engine parts.

The bypassing of unfiltered oil can be avoided by changing the filter unit before the filter elements become so clogged with dirt and contaminants that the bypass valve of the filter unit opens and permits unfiltered oil to pass to the engine parts. However, this solution will not prevent the bypassing of unfiltered oil during the cold starting or initial starting of an engine at which time the viscosity of the oil may be so great as to cause the bypass valve to open because the new filtering element does not give the required rate of flow. One solution to the bypassing of unfiltered oil due to high viscosity in cold starting of the engine is to increase the size of the pores or the passageways in the filter element, or by increasing the size of the filter element, in other words, by increasing its capacity or total filtering surface. However, increasing the size of the pores or passageways of the filter element in the filter unit will increase or raise the minimum size of particles that the filtering element is capable of removing from the oil stream. The solution of increasing the size of the filtering element by increasing its surface area or capacity is not satisfactory since it means a larger filter unit must be used and, therefore, takes up a larger space and increases the size of the parts with attendant increase in the cost of the part materials.

Accordingly, it is an object of the present invention to substantially reduce the bypassing of unfiltered oil around a filtering element in a full-flow unit during cold starting of an engine, without increasing the size of the filtering unit.

It is another object of the present invention to provide a filter unit containing a plurality of filter elements therein in which one filter element has a predetermined resistance to fluid-flow therethrough and another filter element has a substantially different resistance to fluid-flow therethrough.

It is another object of the present invention to provide a full-flow filter unit having a first filtering element capable of passing a substantial fraction of the oil flowing through the element while removing from the oil or fluid all particles larger than a predetermined minimum size, and another filter element capable of passing the remainder of the oil, should the first filter element become clogged or should the first element have a pressure drop thereacross above a predetermined differential pressure, which another filter element is more coarse than said first-mentioned filter element.

It is another object of the present invention to provide a filter unit consisting of at least two individual or separate filtering elements, with one filtering element being a fine-type filter element and offering a greater resistance to flow therethrough and removing all dirt particles and the like down to a substantially small minimum size, and a second filtering element that is of the coarse-type and removes dirt particles from oil or fluid passed therethrough of a larger size than said fine-type filter element and which coarse-type filter element has less resistance to fluid-flow therethrough.

It is another object of the present invention to provide a dual filter unit provided with two filter elements therein in which one filter element is a fine-type filter and the other filter element is a coarse-type filter with valve means provided for permitting the flow of fluid to be filtered through the coarse-type filter when the fine-type filter has a pressure drop thereacross of a predetermined value.

It is another object of the present invention to provide a dual-type filter unit comprising two separate filter elements therein in which the normal flow of fluid to be filtered is through a fine-type filter element and when the fine-type filter element becomes clogged or the pressure drop thereacross exceeds a predetermined value, the flow of fluid passes through a coarse-type filter element as compared to the fine-type filter element first mentioned, and valve means are provided on the downstream side of the coarse-type filter element which permit the discharge of the filtered fluid to the filter unit outlet, and which valve means is provided to unseat or open at a predetermined pressure value above the predetermined pressure value at which the normal flow of fluids through the fine-type filter elements causes the fluid to be passed through the coarse-type filter element.

It is another object of the present invention to provide a spin-on type throwaway filter unit having a casing in which is provided two individual and separate filter elements with one filter element being a fine-type filter and the other filter element being a coarse-type filter element so disposed therein that the normal flow of fluid is through the fine-type filter element and after a predetermined pressure value is exceeded the fluid flowing through the filter unit is diverted to and passes through the coarse-type filter element and which filter unit is provided with valve means on the downstream side of the coarse-type filter element which opens at a predetermined value exceeding the predetermined value of the fine-type filtering element at which time the normal flow of fluid is diverted through the coarse-type filter element.

It is another object of the present invention to provide a filter unit consisting of a casing and a bottom member closing off the open end of the casing which bottom member is provided with threaded means for screwing or threading the filter unit onto the engine block of an internal combustion engine, and which filter element has permanently-sealed therein two separate filter elements, one being a fine-type filter element and the other being a coarse-type filter element which elements are preferably of annular or annulus configuration and consist of resin-impregnated pleated paper having end caps sealing off the opposite edges or ends thereof with valve means disposed on the downstream side of the coarse-type filter element and in communication therewith so that when a certain pressure drop across the fine-type filter element is exceeded the fluid flowing through the filter unit thereafter passes through the coarse-type filter element and unseats the valve means so that the life of the filter unit is substantially prolonged, as compared to filters presently in use.

It is another object of the present invention to provide a spin-on type oil filter having at least two filter elements or filter cartridges therein which generally consist of annular convoluted filter elements made of pleated paper and impregnated with phenolic resin and permanently sealed within a metal housing or casing.

The casing is provided with a bottom member having a threaded nipple or bushing member for screwing onto an adapter bushing secured to the engine block of an internal combustion engine. Resilient sealing means are provided in the bottom member for bearing against an adapter member secured to the engine block so that the filter is sealed with respect to the engine and no oil can leak between the engine block and the resilient sealing means. The individual filter elements or filter cartridges are disposed within the casing in a stacked relationship and preferably with the lower filter element or the filter element adjacent the bottom member consisting of a tighter porosity or a fine-type filter and with the upper filter element consisting of a more porous paper or a coarse-type filter element. The convoluted filter elements are disposed around perforated center tubes or members and means are provided for causing the flow of fluid which enters the filter casing through an inlet to pass through an annular chamber disposed around the outer periphery of the filter elements so that the fluid to be filtered flows in an outside-in direction, or radially inwardly through the filter elements. The unit is provided with a bypass valve means or relief valve means so that the engine will not be starved of oil should both filter elements become unduly clogged or contaminated with dirt. The porosity of the fine-type filter is of a predetermined resistance to fluid-flow therethrough, while the coarse-type filter element also has a predetermined resistance to fluid-flow therethrough which is of a different resistance to fluid-flow than the fine-type filter element or, in other words, the coarse-type filter element has less resistance to flow so that the fluid will flow therethrough at a greater rate of flow than through the fine filter element. A one-way type of valve means is provided on the downstream side of the coarse-type filter element and in communication therewith so that when the fine filter element offers resistance above a predetermined pressure value the fluid will then pass through the coarse-type filter to supply the engine with the required amount of fluid for the lubricating parts of the engine or machine. The valve means on the downstream side of the coarse-type filter element is set at a predetermined value above the predetermined value described in connection with the fine-type filter element so that upon the fine filter element offering resistance above a predetermined value to the fluid-flow therethrough, the downstream valve means of the coarse-type filter element will then open and permit the flow of fluid to continue to the engine parts. The by-pass valve means or the relief valve means is set at a predetermined pressure value above the predetermined pressure value at which the downstream valve of the coarse-type filter element is set so that when the coarse-type filter element becomes unduly clogged then, and then only, will the oil entering the inlets of the filter unit completely bypass both filter elements therein and be discharged from the filter unit into the engine so that the engine is not completely starved of the necessary lubricating fluid or oil.

It is another object of the present invention to provide a spin-on type oil filter unit provided with a plurality of filter elements therein having different predetermined resistances to fluid-flow therethrough which elements are permanently sealed within the casing of a filter unit and which elements are provided with means for holding the filter elements in proper position therein and spaced from the top of the filter casing so that spring means used heretofore in throwaway-type of filter cartridges are not necessary in order to properly position the filter elements therein.

Various other advantages and objects of the present invention will be readily apparent from the following detailed description when considered in connection with the accompanying drawings forming a part thereof and in which FIGURE 1 is a vertical section through the oil filter unit of the present invention;

FIGURE 2 is a bottom plan view of the oil filter unti;

FIGURE 3 is a detail view of the locking means for positioning the filter elements vertically of the filter housing;

FIGURE 4 is a detail view of the spacer means for positioning the filter elements laterally of the housing;

FIGURE 5 is a detail view of the coarse filter element valve means;

FIGURE 6 is a bottom plan view of the valve means shown in FIGURE 5;

FIGURE 7 is a top plan view of the anti-drain back valve means; and

FIGURE 8 is a bottom plan view of the relief valve and anti-drain back valve means, illustrating the fingers thereon.

Referring to the drawings, the reference numeral 10 generally designates an oil filter or filter unit, provided with a thin walled cylindrical metal casing or housing 12. The upper end of the housing 12 is provided with a closed domed-shaped end for teeth. The lower end of the casing 12 is open and is flared outwardly at 20 and thereafter has a vertical downwardly extending rim 22 which terminates in a vertical rolled seam 24 bent back upon itself as is best shown in FIGURE 1.

The oil filter is provided with a bottom member 26 which is preferably made of metal and is substantially thicker than the cylindrical casing 12 and is of circular configuration. Bottom member 26 has its circumference of sufficient size or diameter so that the vertical rim 22 of the casing bears against its circumference. Peripheral portion 28 of the bottom member is inclined slightly downwardly and inwardly toward its central portion 30, and is inclined downwardly at a steeper angle at 31 and thereafter extends horizontally at 32 adjacent its center after which it extends vertically upwardly to provide a bushing or nipple 33 disposed centrally thereof. Nipple 33 is internally threaded and is adapted to be screwed onto an adapted bushing or member, not shown, secured to the engine block of an internal combustion engine. The portion of the bottom member between 31 and 32 is provided with a plurality of circumferentially spaced oil inlet openings or ports 34 through which oil from the engine flows into the filter casing 12. The horizontal portion 32 provides a shoulder on the bottom member around nipple 33 for mounting a short sleeve 36 thereon. Sleeve 36 is disposed on the nipple 33 to form an oil-type seal therewith but it is not fixedly secured thereto.

Another sleeve 40 for a ring member which is substantially shorter than the sleeve 36 is mounted around the inner sleeve 36 and is preferably secured thereto by a press fit and forms an oil-type seal therewith. Sleeve 40 is provided with a laterally extending portion 42 forming an annular ring around the inner sleeve 36. Portion 42 is provided with a plurality of circumferentially spaced oil bypass ports or openings 44. Lateral portion 42 is also provided with inner and outer ribs 46 and 48, respectively, for seating an annular or ring-type disc valve 50 thereon. Valve 50 is the bypass or relief valve of the oil filter and a spring member 52 mounted around the inner sleeve 36 normally urges or biases the valve 50 into a seated or closed position to close off or seal off the oil bypass ports 44. Spring member 52 is secured to the inner sleeve by flaring the upper edge of the sleeve 36 in an outward direction. The outer peripheral end of the lateral portion 42 extends vertically downwardly at 54, and terminates in a substantially horizontally extending rim 56. The rim 56 forms a seat for the oil filter elements or cartridges to properly position them within the filter casing as hereinafter described.

The oil filter elements or cartridges are designated as 58 and 60. Filter element 58 comprises the fine filter with a predetermined resistance to oil-flow therethrough that is substantially greater than the predetermined resistance to oil-flow through the coarse filter element 60. It will also be noted that the fine filter element 58 is substantially larger than the coarse filter element 60. The fine filter element 58 is also disposed adjacent the bottom member 26, whereas the coarse filter element is disposed away therefrom, and the coarse filter element 60 is also stacked upon the fine filter element 58.

Fine-filter element 58 comprises an annulus or pleated paper impregnated with phenolic resin with the convolutions or pleates extending in a radial direction around a perforated center tube or member 62. The lower edges or ends of the pleats 64 of filter element 58 are sealed off by an annular end cap 66 made preferably of metal and having an inturned or upturned rim 68 adjacent the outer side of the pleats. End cap 66 is provided with an outwardly extending rim 70 provided with a plurality of circumferentially spaced oil ports 72 therein. The end cap is provided with a vertically downwardly extending section 74 formed integral with the rim 70 and terminating in an outwardly extending or flared lip 76. The lip 76 extends below the flared portion 20 of the casing 12 and is disposed between this flared portion 20 and seats on the upper surface of the bottom member 26.

The end cap 66 is seated on the rim 56 and the surface of the center tube 62 fits around the outside of the vertical part 54 of the lateral portion 42. The pleats 64 are secured to the end cap 66 by any well-known adhesive cement and are of such a width that they are disposed between the upturned or inturned rim 68 and the part 54, as is clearly shown in the drawings. The rim 56 is disposed in spaced relationship with the upper surface of the bottom member 26 so that oil can enter the inlet ports 34 and pass underneath or below the end cap 66 and flow through ports 72 into the annular channel or chamber 78 formed between the outer surfaces of the pleats and the inner surface of the casing 12.

The upper edges of the pleats 64 are sealed off by a circular disc-end cap 80, prefearbly made of metal and having inturned outer and inner rims 82 and 84, respectively. Rim 82 is vertical while rim 84 is diagonally disposed and the end cap 80 is provided with a central horizontal portion 86 provided with a central opening 88 therein having a diagonally inwardly and downwardly extending lip 90 defining the circular opening 88.

If desired, instead of utilizing the filtering material consisting of resin-impregnated pleated paper, the filtering material may comprise an annular core of fibrous material having inner and outer perforated cylindrical members acting as sheathing or covering members for the fibrous material, with said perforated members being similar in structure to the perforated member 62 already described. The perforated members would extend between the end caps as described herein which end caps would be very similar in structure to the end caps 66 and 68. Also, if desired, the filtering element may comprise an annular core of fibrous material having two layers of pervious, knitted material covering the inner and outer surfaces theerof with the end caps already described covering the end surfaces of the material.

A one-way flow valve is provided for closing off the central opening 88 in the upper end cap 80. This valve consists of a spider member 92 having a substantially square bottom 94 with preferably four vertical legs or strap members 96 extending upwardly therefrom and provided with outwardly turned horizontal portions 98 secured to the underside of the central portion 86 by any suitable means such as tack-welding, spot-welding and the like. Members 96 are disposed on each side of the edges of the bottom 94 and are substantially less in width than the edge of the adjacent edge of the bottom 94 so that substantially rectangular-shaped openings or spaces 100 are provided between the strap members 96 to permit oil to be discharged through said spaces. A coil spring 102 is mounted within the strap members 96 and normally urges or biases a fibrous, circular valve disc 104 into a closed position and seated against the lip 90 to close off the central opening 88.

The upper filter element 60 is preferably an annulus or pleated paper impregnated with phenolic resin with a plurality of convolutions or pleats 106 extending in a radial direction around a perforated center tube or member 108. The opposite ends or edges of the pleats 106 are sealed off by end caps 110 and 112. End cap 110 is provided with inturned outer rims 114 and is provided with a central opening 116 adjacent the inner sides of the pleats 106 with the center tube 108 seated on the end cap 110 adjacent the central opening 116. Upper end cap 112 has a V-shaped trough 118 formed therein by a circular protuberance 120 closing off the upper end of the center tube 108 and the inner inturned rim 122 of end cap 112. End cap 112 also is provided with an inturned rim 124 adjacent the outer side of the pleats and L-shaped spacer members 126 circumferentially spaced around the circumference of the end cap 112 so as to properly position the filtering element 60 laterally with respect to the inner surface of the casing 12 to provide a uniform area in the annular chamber 78 through which the oil flows.

The end cap 110 is secured to the end cap 80 by any suitable means, such as tack-welding or spot-welding or by utilizing adhesive cement, if desired, so that the filter elements 58 and 60 are disposed in vertical alignment with each other within the casing 12. It will be noted that there is a space or chamber 128 between the dome 14 of the casing 12 and the end cap 112. Normally, this space would have a spring member disposed therein in order to maintain the filter cartridge or cartridges seated upon the rim 56, but in the present invention the provision of the outturned rim or outwardly flared rim 76 and the outturned or flared section 20 of the casing sandwiched between 20 and the upper surface of the bottom member 26 maintains the filter cartridges properly seated vertically of the casing. This permits the casing 12 to be utilized, if desired, for inserting therein and permanently sealing therein filter cartridges of different heights or vertical sizes.

If desired, the filter cartridges 60 may be an annular core of fibrous material or a fibrous mass, as already described in connection with the finer filter element 58. It will be noted also that the height of the pleats 106 of the coarse filter element 60 is substantially shorter than the height of the fine filter element 58.

A metal retainer plate 130 is secured to the outer surface of the bottom member 26. Retainer plate 130 is of annular configuration and is secured to bottom member 26 by tack-welding, spot-welding, soldering or any suitable means. Retainer plate 130 is disposed adjacent the peripheral portion 28 of the bottom member and is provided with a continuous groove or recess 132 adjacent its inner periphery for receiving therein a resilient ring gasket member 134, preferably of rubber which bears agains the engine block or the engine block adapter member when the oil filter unit is screwed thereon. The resilient gasket member is substantially square in cross-section and the recess or groove 132 in which it is disposed is of substantially the same configuration so that the gasket member 134 can be press-fitted therein and a substantial portion of the gasket member can extend below or project outwardly of the recess. Gasket member 134 and the recess 132 are disposed or positioned in a direction laterally outwardly of or beyond the oil inlet ports 34. The gasket member prevents any oil leakage between the oil filter and the engine block. The retainer plate 130 extends diagonally upwardly at 136 from adjacent the outer leg of the recess 132 and bears against the undersurface of the bottom member 26 adjacent the vertical rim 22 as indicated at 138. The retainer plate thereafter extends downwardly and upwardly as indicated at 140 and is bent around the rolled seam 24 of the casing 12 so as to provide a rolled seam therewith and form an oil-type seal. The retainer plate 136 at 138 blocks the bottom member 26 against the flared portion 76 so as to lock the portion 76 within the outwardly flared portion 20 of the casing 12 to properly position the filter cartridges within the casing.

An anti-drain back valve 142 is provided within the center tube 62 by a plurality of resilient fingers or members 144 which bias a diaphragm or thin, annular resilient member 146 against a valve seat 148 formed integral with and extending across an annular ring member 150 having its outer edge 152 curled over the upper edge of the sleeve 36. The plurality of finger members 144 are formed integral with a ring member secured between the ring 152 and the upper outwardly-flared edge of the sleeve 36. The anti-drain back valve is arranged so that the oil that is discharged through the filter elements into the center tube 62 unseats the resilient diaphragm 146 from its normally seated position against member 148 so that the oil passes through inner sleeve 36 and is discharged through the nipple 33 into the engine block. The anti-drain back valve is a one-way flow valve and prevents any oil from the engine block from entering back into the center tube 62 as the pressure of the oil and the resilient fingers 144 would maintain the diaphragm 146 in a seated or closed position against member 148 should there be any oil pressure or back-flow in the inner sleeve 36.

In the operation of the present invention, oil to be filtered passes from the internal combustion engine or machine through oil inlet ports 34 and between the bottom of the fine filter element 58 and the upper surface of the bottom member 26 and thereafter flows upwardly through the ports 72 into the annular chamber 78 and thereafter in a radially, inwardly direction through the filter element 58. The filter element 58, which is the fine filter element, provides a fine filtration of oil passed therethrough since its porosity is of substantially smaller size than the porosity of the coarse filter element 60. As the contaminated or dirty oil is passed through the pleats of the filter element 58 any particles of dirt, contaminants and the like are deposited on the upstream side of the filter element and clean oil is discharged into the center tube 62. Thereafter the oil pressure unseats the diaphragm 146 from contact or its seated position upon the member 148 and the clean oil is discharged through the inner sleeve 36 and nipple 33 back into the engine. This is the normal operation of the filter unit and occurs when the engine is sufficiently warm so as to heat-up the oil used for lubricating the engine parts.

The pressure drop across the fine filter element 58 may be approximately in the range of 1 to 3 p.s.i. which is considered efficient operation of the filter unit to remove the unwanted dirt particles and contaminants from the oil. The surface area of the filter element 58 is also of sufficient capacity to provide the engine, for which the filter unit is being used, with a sufficient flow of oil so that there is a proper lubrication of the parts. During this normal operation of the filter element, the coarse filter element 60, which has a greater porosity, or offers less resistance to flow of the oil therethrough, with respect to the fine filtering element, is not in use since the valve disc 104 on the discharge side of the filter element 60 is closed at this time.

When the pressure drop across the fine filter element 58 exceeds a predetermined value, for example 7 p.s.i., this can be considered as a pressure drop across the filter element 58 which is in excess of efficient operation of the flow of oil through the filter elment 58. This excessive pressure drop across filter element 58 may occur when the oil is highly viscous, such as when the engine is initially started or operated and the oil is cold. This condition may also occur as the upstream surface of filter element 58 becomes gradually or progressively clogged due to removal of the dirt and contaminants from the oil being filtered, as the hours of use of the filter unit increase. When the pressure drop across filter element 58 becomes excessive or exceeds a predetermined value, the oil then flows through the more coarse filter element 60 and passes into its center tube 108. The coarse filter element will remove dirt and contaminants from the oil, but it will remove particles of a larger size since it is less resistant to flow, than the particles removed by the fine filter element 58. The valve disc 104 will be unseated at this time to permit a flow of the filered oil from the filter element 60 into the center tube 62 of the fine filter element 58. This will occur because the spring force in the coil spring 102 is set at a predetermined value to permit the valve to open, which value for example may be 6 p.s.i. Thereafter the oil flows downwardly in the center tube 62 and opens the diaphragm 146 and flows out of the filter unit through nipple 33 into the engine. At this time there is no flow of oil through the filter element 58.

Should the filter element 58 exceed its predetermined pressure drop thereacross, due to initial starting of the engine when the oil is cold, the oil will be filtered through the coarse fitler element 60 and when the oil is sufficiently warmed the oil will again flow through the filter element 58. This will occur because the high viscosity of the oil has been lowered and the pressure drop across the fine filter element 58 will decrease. Thus, any particles that may have passed through the coarse filter element 60, and which particles are of a sufficient size to be filtered by the fine filter element 58, will now be progressively removed from the oil as the oil again is passed through the fine filter element 58.

Thus, the present invention provides a filter unit having a plurality of individual filtering elements therein, one being a coarse filter and the other being a fine filter, so that the oil will be filtered by the fine filter during normal operation of the engine, and will thereafter be filtered by the coarse filter should a certain predetermined pressure drop occur across the fine filter so that the oil will not have to bypass the filtering element completely, as frequently occurs in a full-flow unit. Thus, the present invention substantially reduces the bypassing of unfiltered oil around a filter element in a full-flow unit during cold starting of an engine.

The present invention further provides a unitary filter unit having a plurality of filter elements therein in which one portion of the filter unit, that is the fine filter element, is capable of passing the required amount of oil to the engine during normal operation of the filter unit and engine, and another portion, that is a coarser filter element for passing a sufficient flow of oil to the engine for lubricating purposes and removing dirt particles therefrom, without causing the oil to entirely bypass the filter elements and unfiltered oil to be supplied to the engine.

The present invention further provides a filter unit having a plurality of filter elements therein which a coarse filter element is utilized with a fine fielter element in order to increase the serviceable life of the filter unit over a prolonged period of time so as to provide an efficient filter element while at the same time increasing the usable service life or hours of use of the filter element.

The present invention further provides a filter unit having at least two filtering elements therein which substantially differ in resistance to fluid-flow therethrough, with a bypass valve so that should the filter become completely clogged the oil entering the oil inlet ports 34 can flow through the ports 44 and unseat the filter bypass valve 50 so that the oil then flows past the diaphragm 146 and the engine is not completely starved of oil.

The present invention further provides a filter unit having a plurality of filtering elements therein, with one element being coarse and the other element being fine with valve means disposed adjacent the downstream side of the coarse filter element so that should the fine filter element become clogged for any reason, or a predetermined pressure drop across the fine filter element be exceeded, the oil will then flow through the coarse filter and open the valve on the downstream side of the coarse filter and still supply sufficient oil to the engine.

The present invention further provides a spin-out type throwaway oil filter unit having a fine filter element and a coarse filter element therein in which the fine filter element is disposed adjacent the bottom member of the spin-on type filter and further provided with an anti-drain back valve so that no oil can leak from the engine back into the filter unit when the engine is stopped, and thus the engine will not be starved of oil upon initial starting thereof.

The present invention further provides a spin-on type filter unit having a plurality of filter elements therein with substantially different resistances to flow therethrough provided with locking-in means which will maintain the filter cartridges in a seated position and thereby eliminates the spring means utilized heretofore adjacent the dome portion of the casing in order to maintain the filter elements or cartridges properly seated on the filter support member.

The present invention further provides a locking means for properly positioning filter cartridges within a spin-on type filter unit, which maintain the filter cartridges in proper vertical relationship with respect to the filter casing and spacer means adjacent the upper end of one of the filter cartridges to properly maintain the upper end of the filter cartridges laterally spaced with respect to the casing of the filter unit.

The present invention further provides a spin-on type filter cartridge with locking means sandwiched between the casing and the bottom member to properly position the filter cartridges vertically of the casing and so that filter cartridges of varying height may be utilized within the filter casing.

Inasmuch as various changes may be made in the form, location and relative arrangement of the several parts without departing from the essential characteristics of the invention, it will be understood that the invention is not to be limited except by the scope of the appended claim.

What is claimed is:

1. A spin-on type throwaway filter unit comprising a cylindrical housing open at one end, a circular bottom member fitting within said open end and closing it off, threaded means on said bottom member for screwing it onto an engine block, inlet and outlet port means in said bottom member for passing oil to be filtered therethrough, a tubular member disposed on said threaded means, a filter support member comprising an annular ring mounted on said tubular member, an annular fine pleated filter element seated on said support member, an annular coarse pleated filter element disposed above said fine filter element in vertical stacked relationship, metal end caps sealing off the opposite ends of said filter elements, spaced circumferential means extending outwardly of the upper coarse filter element end cap and spacing the filter elements laterally of said housing to provide an annular chamber around said pleats, the lower fine filter element cap having locking means disposed between said bottom member and an outwardly extending portion of said housing to position the filter elements in a vertical direction in said housing, perforated center members disposed adjacent the inner sides of said annular filter elements, filter bypass means including an annular valve disc covering bypass ports in said filter support member and set at a predetermined pressure value to bypass unfiltered oil from said inlet means to said outlet means, the upper end cap of said fine filter element having a central opening therein, a coarse filter valve means depending from said fine filter element upper end cap for closing off said central opening, comprising a bottom member with spaced vertical walls having horizontal legs secured to the lower fine filter element upper end cap and a circular valve disc, said central opening being in communication with the downstream side of the central member of said coarse filter element, and spring means maintaining said coarse circular valve disc means closed over said central opening until a predetermined differential pressure value is exceeded across said coarse element which is greater than the pressure differential drop value across said fine filter element during normal operation, so oil only flows through said fine filter element at one time, and through said coarse filter element and coarse valve means at a different time, said bypass valve means being set at a predetermined pressure value greater than the predetermined pressure value of said coarse valve means, and an anti-drain back valve means is disposed in the fine filter element central member on the upper end of said tubular member.

References Cited

UNITED STATES PATENTS

| | | | |
|---|---|---|---|
| 3,184,062 | 5/1965 | Humbert | 210—136 X |
| 3,232,437 | 1/1966 | Hultgren | 210—443 X |
| 3,283,904 | 11/1966 | Buckman et al. | 210—132 |

REUBEN FRIEDMAN, *Primary Examiner.*

F. SPEAR, *Assistant Examiner.*